US012053896B2

(12) United States Patent
Silvius et al.

(10) Patent No.: US 12,053,896 B2
(45) **Date of Patent: *Aug. 6, 2024**

(54) CUTTING MECHANISM

(71) Applicant: KONINKLIJKE PHILIPS N.V., Eindhoven (NL)

(72) Inventors: Johannes Silvius, Drachten (NL); Ingmar Grasmeijer, Leeuwarden (NL); Gerrit Klaseboer, Steenwijk (NL); Sjoerd Ijpma, Klagenfurt (AT); Mark Klaas Albert Veldhuis, Drachten (NL); Marcel Pol, Klazienaveen (NL); Margarita Zwanette Van Raalte, Tuk (NL); Albert Van Der Marel, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,164

(22) Filed: Sep. 16, 2022

(65) Prior Publication Data

US 2023/0074295 A1 Mar. 9, 2023

Related U.S. Application Data

(63) Continuation of application No. 16/609,765, filed as application No. PCT/EP2018/061634 on May 5, 2018, now Pat. No. 11,478,944.

(30) Foreign Application Priority Data

May 5, 2017 (EP) .................................... 17169744

(51) Int. Cl.

*B26B 19/14* (2006.01)
*B26B 19/38* (2006.01)

(52) U.S. Cl.

CPC .......... *B26B 19/143* (2013.01); *B26B 19/384* (2013.01)

(58) Field of Classification Search

CPC ..... B26B 19/14; B26B 19/141; B26B 19/143; B26B 19/38; B26B 19/384; B26B 19/3846; B26B 19/3893

See application file for complete search history.

(56) References Cited

U.S. PATENT DOCUMENTS 3,292,251 A 12/1966 Bakker
5,544,414 A 8/1996 Dekker (Continued)

FOREIGN PATENT DOCUMENTS

EP 0428211 A1 5/1991
EP 0652086 A1 5/1995

(Continued)

OTHER PUBLICATIONS

International Search Report and Written Opinion Dated Aug. 20, 2018 For International Application No. PCT/EP2018/061634 Filed May 5, 2018.

*Primary Examiner* — Evan H MacFarlane

(57) ABSTRACT

A cutting mechanism for a hair cutting apparatus, such as a shaving apparatus, includes an outer cutting member having hair-entry openings and an inner cutting member having cutting elements each having a first cutting edge. The inner cutting member is moveable with respect to the outer cutting member so as to perform a cutting operation within a cutting region of the cutting mechanism. Adjacent hair-entry openings are separated by a dividing element having a cutting section that lies within the cutting region and a non-cutting section that is outside the cutting region. The non-cutting section includes an inner wall facing the inner cutting member and a side wall which is substantially perpendicular (Continued)

to the inner wall. A single chamfer is provided between the inner wall of the non-cutting region and the side wall of the non-cutting region.

12 Claims, 6 Drawing Sheets

(56) References Cited

U.S. PATENT DOCUMENTS

| | | | | |
|---|---|---|---|---|
| 6,032,365 | A | 3/2000 | Hodges | |
| 7,356,929 | B2 | 4/2008 | Nakano | |
| 8,191,264 | B2 | 6/2012 | Veenstra | |
| 11,478,944 | B2 * | 10/2022 | Silvius | B26B 19/143 |
| 2006/0179660 | A1 | 8/2006 | Nakano | |
| 2011/0232098 | A1 | 9/2011 | Kobayashi | |
| 2013/0000126 | A1 | 1/2013 | Higuchi | |
| 2017/0217030 | A1 | 8/2017 | Mimura | |

FOREIGN PATENT DOCUMENTS

| | | | |
|---|---|---|---|
| EP | 1690654 | A1 | 8/2006 |
| WO | 2014/147520 | A1 | 9/2014 |

* cited by examiner 100
102
106
106
30
16
24
26
28
104

102
104

102
104

102
104

40
42
16
104

CUTTING MECHANISM

CROSS-REFERENCE TO RELATED APPLICATION

This application is a Continuation of U.S. patent application Ser. No. 16/609,765 filed on Oct. 31, 2019, which is the U.S. National Phase application under 35 U.S.C. § 371 of International Application No. PCT/EP2018/061634 filed on May 5, 2018, which claims the benefit of European Application No. 17169744.4 filed on May 5, 2017. These applications are hereby incorporated by reference herein.

FIELD OF THE INVENTION

There is disclosed a cutting mechanism for a hair cutting apparatus, such as a shaving apparatus.

BACKGROUND OF THE INVENTION

A previously considered rotary shaving apparatus comprises a cutting mechanism comprising an outer cutting member and an inner cutting member. Hair-entry openings are formed in the outer cutting member. During use the inner cutting member rotates relative to the outer cutting member so as to perform a cutting operation in which hairs introduced into the hair-entry openings are cut. Due to the shape of the hair-entry openings there may be a risk of snagging and pulling of the hairs. This may result in a loss of comfort.

A further previously considered rotary shaving apparatus disclosed in WO 2014/147520 A1 comprises an external cutting member and an internal cutting member. The external cutting member comprises at least one hair-entry aperture which is bounded by at least a first and a second wall portion of the external cutting member, at least the first wall portion comprising a cutting edge for cooperation with a cutting edge of the internal cutting member. An edge portion of the second wall portion facing a plane comprising the cutting path, in a cross section taken substantially perpendicularly to the plane comprising the cutting path, touches a virtual circle with a radius of at least 30 micrometers at at least two contact points on the virtual circle. The edge portion of the second wall portion may be difficult to manufacture, may provide an increased number of edges upon which hairs may snag, or may provide surfaces at non-optimal angles which may increase the tendency for hair snagging on the edge portion.

EP 0 652 086 A1 discloses a shaving unit of a shaving apparatus comprising an external shaving member and an internal shaving member which is rotatabe relative to the external shaving member. The external shaving member has a plurality of lamellae which extend in substantially radial directions and between which hair-entry apertures are formed. The lamellae have radial end portions which, seen in a radially extending cross-section of the shaving unit, comprise a rounded outer surface and an inner surface which extends obliquely relative to a vertical circumferential wall of the external shaving member.

Accordingly, it is clear that improvements may be required in the field of cutting mechanisms.

SUMMARY OF THE INVENTION

According to a first aspect of the invention, there is provided a cutting mechanism for a hair cutting apparatus, comprising: an outer cutting member comprising a plurality of hair-entry openings; an inner cutting member comprising a plurality of cutting elements each having a first cutting edge, wherein the inner cutting member is moveable with respect to the outer cutting member so as to perform a cutting operation within a cutting region of the cutting mechanism; wherein adjacent hair-entry openings are separated by a dividing element comprising: a cutting section that lies within the cutting region, the cutting section having an inner wall facing the inner cutting member and a side wall which meets the inner wall to form a second cutting edge that is arranged to cooperate with the first cutting edges, and a non-cutting section that is outside the cutting region, the non-cutting section comprising an inner wall facing the inner cutting member and a side wall which is substantially perpendicular to the inner wall of the non-cutting section, wherein, seen in a cross-section of the dividing element taken perpendicularly to the inner wall of the non-cutting section and extending parallel to a local movement direction of the first cutting edges relative to the dividing element, a single planar chamfer is provided between the inner wall of the non-cutting section and the side wall of the non-cutting section.

A cutting mechanism according to the invention may provide advantages over previously considered cutting mechanisms and may solve one or more of the problems in relation to previously considered cutting mechanisms. In particular, the cutting mechanism according to the invention may be more easily and cheaply manufactured and may reduce hair snagging.

During a cutting operation of the cutting mechanism according to the invention, hair cutting may occur along or in a single planar cutting area. The cutting area may therefore lie in a cutting plane. The cutting area may be defined by the path followed by the first cutting edges of the inner cutting member when the inner cutting member moves with respect to the outer cutting member. In embodiments wherein the inner cutting member is rotatable with respect to the outer cutting member about an axis of rotation, the first cutting edges may follow an annular path and the cutting area may therefore be annular. In embodiments wherein the inner cutting member performs a linear reciprocating motion with respect to the outer cutting member in two opposed linear movement directions, the first cutting edges may follow a straight path and the cutting area may therefore be a straight area with a main direction of extension parallel to said linear movement directions. The "cutting region" may be defined as a volume directly above and below the cutting area. The "cutting section" of the dividing element lies within the cutting region, in particular when seen in a direction perpendicular to the cutting area from a point of view above or below the cutting area. The "non-cutting section" of the dividing element is outside the cutting region, in particular when seen in a direction perpendicular to the cutting area from a point of view above or below the cutting area. In embodiments wherein the inner cutting member is rotatable with respect to the outer cutting member about an axis of rotation, the "non-cutting section" therefore may be situated radially inward or radially outward of the "cutting region" with respect to the axis of rotation.

The term "chamfer" should be understood to mean an intermediary or transitional surface between two faces or walls, wherein the "chamfer" is planar (i.e. non-curved) at least in a cross-section of the dividing element taken perpendicularly to the inner wall of the non-cutting section of the dividing element and extending parallel to a local movement direction of the first cutting edges relative to the dividing element. However, because the chamfer will generally be provided along the edge between the inner wall of the non-cutting section and the side wall of the non-cutting section and because said edge may be curved along its main direction of extension, the chamfer may be curved along said main direction of extension. For example, in embodiments wherein the inner cutting member is rotatable with respect to the outer cutting member about an axis of rotation, the chamfer is planar in cross-sections of the dividing element taken perpendicularly to the radial direction with respect to the axis of rotation, but the chamfer may be curved in the radial direction with respect to the axis of rotation, in particular when the hair-entry slots are curved in the radial direction.

In an embodiment of a cutting mechanism according to the invention, the non-cutting section comprises a first side wall and a second side wall which are substantially perpendicular to the inner wall of the non-cutting section, wherein, seen in the cross-section of the dividing element, a single planar chamfer is provided between the inner wall of the non-cutting section and the first side wall and a single planar chamfer is provided between the inner wall of the non-cutting section and the second side wall. The first and second side walls may be opposing side walls, i.e. the first and second side walls may be provided on opposite sides of the inner wall of the non-cutting section.

In an embodiment of a cutting mechanism according to the invention, the non-cutting section comprises a first portion positioned on a first side of the cutting region and a second portion positioned on a second side of the cutting region opposite to the first side.

In an embodiment of a cutting mechanism according to the invention, the or each single chamfer is formed over a height of between 10% and 40% of a distance between an inner surface and an outer surface of the dividing element. A height of the or each single chamfer may be between 0.02 mm and 0.10 mm. The height may be measured in a direction perpendicular to the inner surface. The distance between the inner surface and the outer surface of the dividing element may be between 0.05 mm and 0.5 mm, or between 0.05 mm and 0.3 mm, or between 0.1 mm and 0.3 mm. The inner surface and the outer surfaces of the dividing element may be substantially parallel to one another and may be parallel to the cutting area followed by the first cutting edges. A width of the hair-entry openings may be between 0.15 mm and 0.45 mm. The width may be measured in a direction parallel to a local movement direction of the first cutting edges relative to the dividing element. In embodiments wherein the inner cutting member is rotatable with respect to the outer cutting member about an axis of rotation, the width may be measured in a tangential direction relative to the axis of rotation. The hair-entry openings may generally be elongate, and the width may be measured in a direction perpendicular to the direction of elongation of the hair-entry openings.

In an embodiment of a cutting mechanism according to the invention, the inner cutting member is rotatable about a rotational axis with respect to the outer cutting member so as to perform a cutting operation within an annular cutting region of the cutting mechanism. The inner cutting member may be rotatable in a single direction. The rotational axis may be perpendicular to the cutting area. A motor may be provided for rotationally driving the inner cutting member.

In a further embodiment of a cutting mechanism according to the invention, wherein in particular the inner cutting member is rotatable with respect to the outer cutting member in a single direction, the cutting section comprises a first side wall, which meets the inner wall of the cutting section to form the second cutting edge, and a second side wall which is substantially perpendicular to the inner wall of the cutting section, wherein, seen in a further cross-section of the dividing element taken perpendicularly to the inner wall of the cutting section and extending parallel to a local movement direction of the first cutting edges relative to the dividing element, a further single planar chamfer is provided between the inner wall of the cutting section and the second side wall of the cutting section. The single chamfer may be continuous with the single chamfer provided between the side wall of the non-cutting section and the inner wall of the non-cutting section. The first side wall of the cutting section may also be substantially perpendicular to the inner wall of the cutting section.

In a further embodiment of a cutting mechanism according to the invention, wherein the inner cutting member is rotatable about a rotational axis with respect to the outer cutting member, at least a portion of the non-cutting section is positioned radially outwards or radially inwards of the annular cutting region with respect to the rotational axis. The non-cutting section may comprise a first portion positioned radially outwards of the annular cutting region and a second portion positioned radially inwards of the annular cutting region. The cutting section may be disposed between the first and second portions of the non-cutting section.

In embodiments wherein the inner cutting member is rotatable about a rotational axis with respect to the outer cutting member, the plurality of hair-entry openings may be circumferentially arranged on the outer cutting member with respect to the rotational axis. Each hair-entry opening and/or each dividing element may have a main radial extension with respect to the rotational axis. Each hair-entry opening and/or each dividing element may extend in a direction substantially perpendicular to a local movement direction of the first cutting edges and parallel to the cutting area. The hair-entry openings and dividing elements may however also have curved shapes in radial cross-sections that comprise the rotational axis.

In an embodiment of a cutting mechanism according to the invention, the or each single chamfer forms an internal angle with the respective side wall of between 120° and 160°.

In an embodiment of a cutting mechanism according to the invention, the outer cutting member is at least partially formed by pressing or coining. The or each single chamfer may be formed by pressing or coining.

According to a second aspect of the invention, there is provided a hair cutting apparatus comprising at least one cutting mechanism in accordance with any of the embodiments described here before. The hair-cutting apparatus may be a shaver, a hair trimmer, a beard trimmer or the like.

According to a third aspect of the invention, there is provided a method of manufacturing an outer cutting member of a cutting mechanism in accordance with the invention, the method comprising: providing a blank comprising the plurality of hair-entry openings, wherein adjacent hair-entry openings are separated by the dividing element; and pressing (or coining) the blank with a die so as to form the single chamfer along a length of an edge between the inner wall of the non-cutting section of the dividing element and the side wall of the non-cutting section of the dividing element. The length of the single chamfer thus formed may correspond to the length of the non-cutting section. The pressing step may form a single chamfer on multiple dividing elements or on all dividing elements. In order to fully form the outer cutting member, further manufacturing steps may be performed.

There is further provided a method of manufacturing an outer cutting member of a cutting mechanism according to an embodiment wherein the non-cutting section of the dividing element comprises a first side wall and a second side wall each provided with a single chamfer. This method comprises the steps of: providing a blank comprising the plurality of hair-entry openings, wherein adjacent hair-entry openings are separated by the dividing element; and pressing the blank with a die so as to form the single chamfer between the inner wall of the non-cutting section and the first side wall of the non-cutting section along a length of a first edge between the inner wall of the non-cutting section and the first side wall of the non-cutting section, and to form the single chamfer between the inner wall of the non-cutting section and the second side wall of the non-cutting section along a length of a second edge between the inner wall of the non-cutting section and the second side wall of the non-cutting section. The lengths of the single chamfers thus formed may correspond to the length of the non-cutting section.

There is further provided a method of manufacturing an outer cutting member of a cutting mechanism according to an embodiment wherein the cutting section of the dividing element comprises a first side wall comprising the second cutting edge and a second side wall provided with a single chamfer. This method comprises the steps of: providing a blank comprising the plurality of hair-entry openings, wherein adjacent hair-entry openings are separated by the dividing element; and pressing the blank with a die so as to form the single chamfer between the inner wall of the cutting section and the second side wall of the cutting section along a length of an edge between the inner wall of the cutting section and the second side wall of the cutting section. The length of the single chamfer thus formed may correspond to the length of the cutting section.

In an embodiment of a method according to the invention, the die is shaped so as to form the or each single chamfer. The die may comprise at least one chamfer-forming surface having an inclination angle corresponding to the inclination angle of the single chamfer to be formed. The die may be shaped such that pressing the blank with the die causes relative movement between the die and the blank so as to appropriately align the die and the blank. If the blank and the die are not perfectly aligned, as the die is moved towards the blank the shape of the die may cause the blank to move in a direction perpendicular to the pressing direction so as to correctly align the blank with the die.

In an embodiment of a method according to the invention, the die is a first die facing the respective inner wall, and the blank is pressed between the first die and a second die. The second die may face an outer wall of the blank.

In an embodiment of a method according to the invention, wherein the dividing element has an outer wall, a first side wall and a second side wall, pressing the blank between the first die and the second die may profiles an edge between the outer wall and the first side wall of the dividing element and profiles an edge between the outer wall and the second side wall of the dividing element. Pressing the blank between the first die and the second die may form a rounded profile along the edge between the outer wall and the first side wall of the dividing element and may form a rounded profile along an edge between the outer wall and the second side wall of the dividing element. The second die may be shaped so as to profile the edge between the outer wall and the first side wall of the dividing element and to profile the edge between the outer wall and the second side wall of the dividing element.

In an embodiment of a method according to the invention, the method further comprises forming the pressed blank into a cup shape. The cup shape may have a convex outer face and a concave inner face.

The blank may be formed by stamping, electrical discharge machining (EDM), electrochemical machining (ECM), milling, sawing or by any other suitable technique.

The invention may comprise any combination of the features and/or limitations referred to herein, except combinations of such features as are mutually exclusive.

BRIEF DESCRIPTION OF THE DRAWINGS

Embodiments of the invention will now be described, by way of example, with reference to the accompanying drawings, in which.

DETAILED DESCRIPTION OF THE EMBODIMENTS

Figure 1:
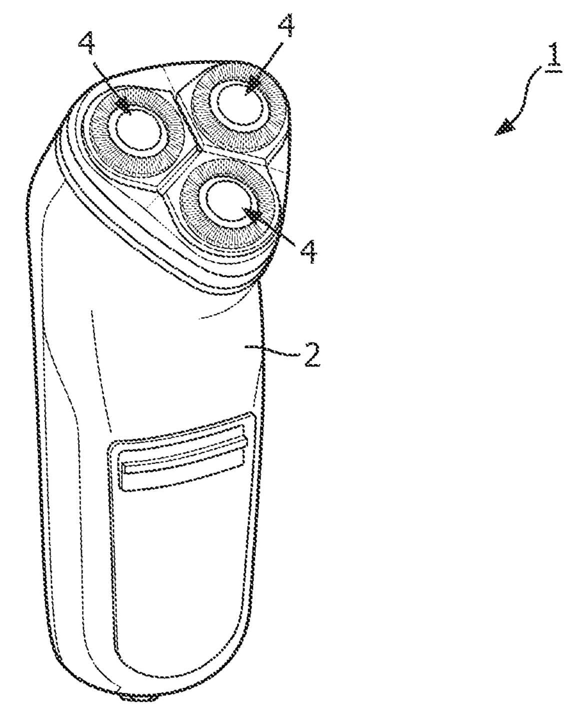
FIG. 1 schematically shows a shaving apparatus according to the invention.

FIG. 1 shows a hair-cutting apparatus according to the invention in the form of a shaving apparatus 1 (shaver). Although a shaving apparatus will be described, it will be appreciated that the invention could be utilised in any suitable hair-cutting apparatus such as a beard or hair trimmer. The shaving apparatus 1 generally comprises a main housing 2 and three rotary cutting mechanisms 4 according to the invention. In use, the shaving apparatus 1 is moved over a user's skin and the cutting mechanisms 4 perform a cutting operation in which hair is cut.

Figure 2:
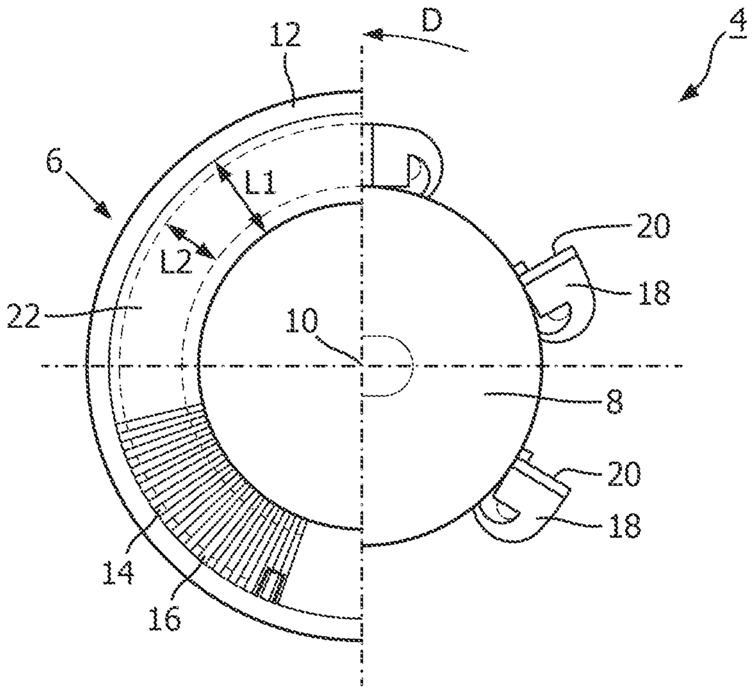
FIGS. 2 and 3 schematically show inner and outer cutting members of a cutting mechanism of the shaving apparatus of FIG. 1.

As shown in FIG. 2 each cutting mechanism 4 comprises an outer cutting member 6 (or cap) and an inner cutting member 8. The inner cutting member 8 is rotatable about a rotational axis 10 with respect to the outer cutting member 6. An electric motor (not shown) is provided within the main housing 2 for rotationally driving the inner cutting member 8 in a single direction D so as to perform a cutting operation. The outer cutting member 6 has a circular outer profile and comprises an annular wall 12. An outer surface of the outer cutting member 6 is provided with a plurality of hair-entry openings 14 (or apertures) which extend through the thickness of the wall of the outer cutting member 6. Each hair-entry opening 14 is elongate and extends in a radial direction with respect to the rotational axis 10. The hair-entry openings 14 are circumferentially arranged on the outer cutting member 6 and are equally spaced. Although it is shown that the hair-entry openings 14 extend in a pure radial direction, in other arrangements they may be inclined to the true radius and/or may be curved in their main direction of extension. Adjacent hair-entry openings 14 are separated by a dividing element 16 (or lamella) which is radially extending in the present embodiment. It will be clear to the skilled person that the dividing elements may also be inclined to the true radius and/or may be curved in their main direction of extension, depending on the shape of the hair-entry openings 14. In the present embodiment, the hair-entry openings 14 and the dividing elements 16 have a radial length L1. As will be described in detail below, the dividing elements 16 define the hair-entry openings 14.

The inner cutting member 8 comprises a plurality of cutting elements 18 which each comprise a first cutting edge 20 which, in the present embodiment, extends in the radial direction relative to the rotational axis 10. The first cutting edges 20 have a radial length L2. As shown in FIG. 2, the radial length L1 of the hair-entry openings 14 is greater than the radial length L2 of the first cutting edges 20. Further, the cutting elements 18 are positioned such that the first cutting edges 20, seen in the radial direction, lie within the radial extent of the hair-entry openings 14. As will be described in detail below, the dividing elements 16 each comprise a second cutting edge, and these are arranged to cooperate with the first cutting edges 20. Thus, as the inner cutting member 8 is rotationally driven in the direction D, the first and second cutting edges cooperate to perform a cutting operation on the hairs present in the hair-entry openings 14. The cutting operation causes cutting to occur mainly in a single cutting plane that is defined as the plane wherein the first and second cutting edges cooperate. In particular cutting occurs in an annular cutting area 22 which lies in the cutting plane and which is defined by the path followed by the first cutting edges 20 during rotation of the inner cutting member 8 and the overlap between the first cutting edges 20 and the second cutting edges. An annular cutting region may be defined as the volume directly above and below the cutting area 22.

It is noted that, in the present embodiment, the annular outer surface of the outer cutting member 6, wherein the hair-entry openings 14 are provided, is planar. However, said outer surface may also be non-planar, and may in particular have a convex shape seen in a cross-section comprising the rotational axis 10. In such embodiments, the first cutting edges 20 will have a curved shape matching the convex shape of the annular inner surface of the outer cutting member 6.

Figure 3:
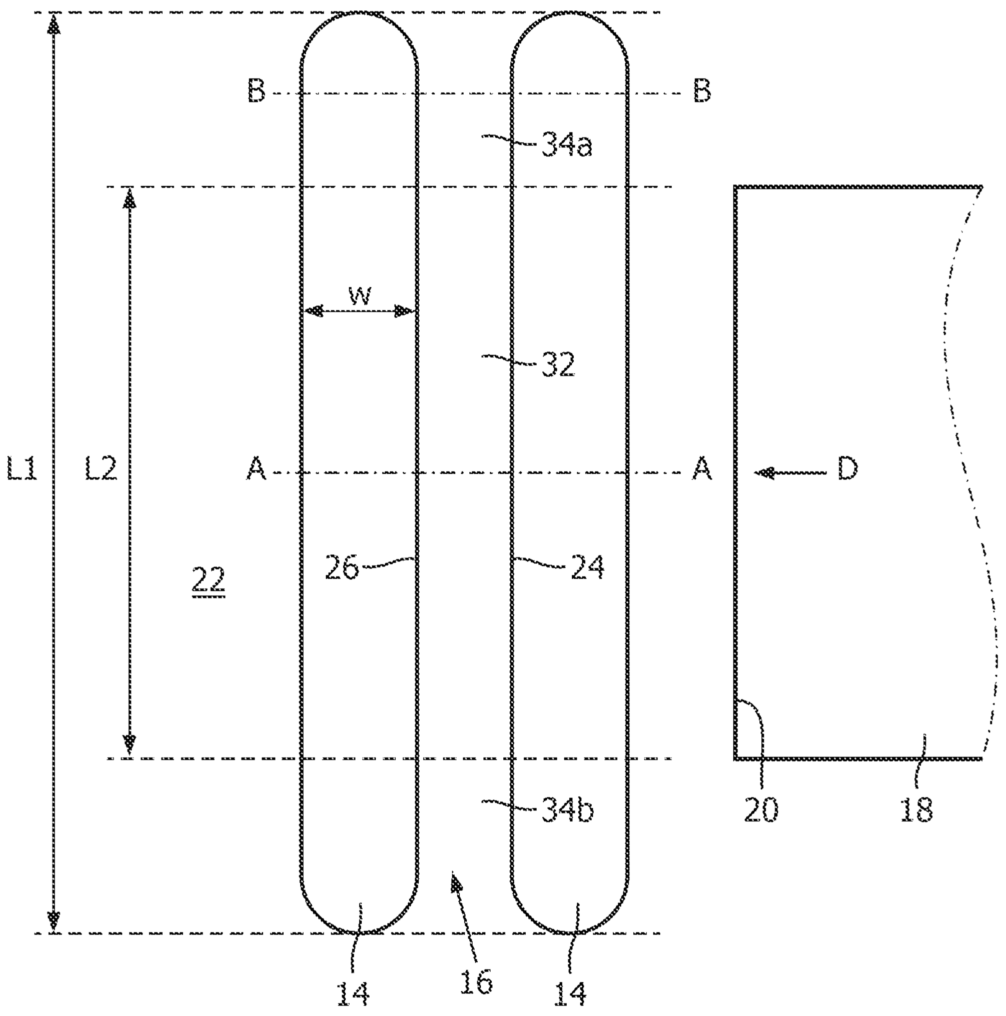
Figure 4:
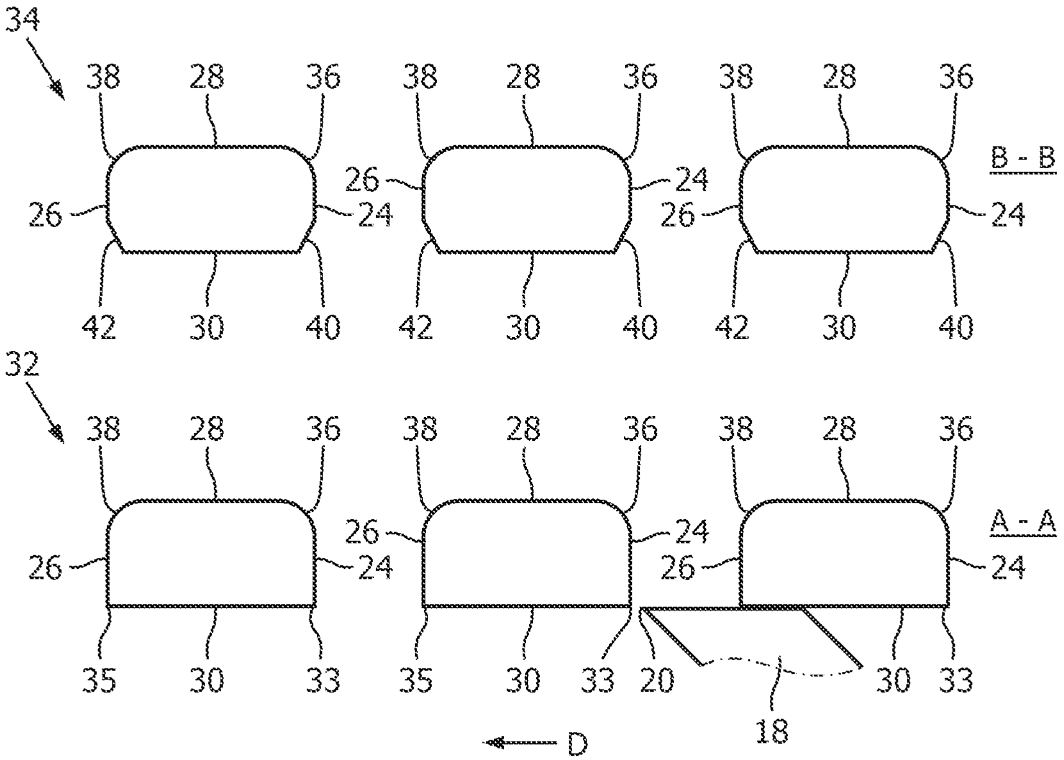
FIG. 4 schematically shows cross-sectional views along the lines A-A and B-B in FIG. 3.

Referring now to FIGS. 3 and 4, each dividing element 16 (or lamella) comprises an outer wall 28 that faces outwards and, in the present embodiment, is substantially parallel to the cutting plane (and therefore perpendicular to the rotational axis 10) and an inner wall 30 (not visible in FIG. 3) that faces the inner cutting member 8 and, in the present embodiment, is parallel to the cutting plane and parallel to the outer wall 28. The width W of the hair-entry openings 14 in a direction parallel to the cutting plane and parallel to the (local) cutting direction D may be between 0.15 mm and 0.45 mm, and may preferably be between 0.19 mm and 0.285 mm. A typical hair may have a diameter of 0.15±0.07 mm.

The dividing element 16 comprises a first central cutting section 32 that lies within the cutting region, and a non-cutting section 34 comprising first and second portions 34*a*, 34*b* that lie outside the cutting region. The position of the cutting section 32 within the cutting region and the position of the non-cutting section 34 outside the cutting region is to be seen in a direction perpendicular to the planar cutting area 22 from a point of view above or below the cutting area 22, as in FIG. 3. In the present embodiment, the first portion 34*a* of the non-cutting section 34 is in a position radially outwards of the cutting region relative to the rotational axis 10, whilst the second portion 34*b* of the non-cutting section 34 is in a position radially inwards of the cutting region relative to the rotational axis 10. Since the non-cutting section 34 is outside of the cutting region, cutting does not occur in the region of the non-cutting section 34.

As best shown in FIG. 4, the cutting section 32 and the non-cutting section 34 of the dividing element 16 have different cross-sections in a plane perpendicular to the cutting plane and perpendicular to the radial direction.

The cutting section 32 of the dividing element 16 comprises a first side wall 24 which bounds an adjacent hair-entry opening, a second opposed side wall 26 which bounds an adjacent opposite hair-entry opening, an outer wall 28 which faces outwards, and an inner wall 30 which faces the inner cutting member 6. The inner and outer walls 28, 30 are spaced apart and parallel and are generally parallel to the cutting plane and perpendicular to the rotational axis 10. The first and second side walls 24, 26 are generally parallel to one another and are substantially perpendicular to the inner and outer walls 28, 30. The first side wall 24 and the inner wall 30 meet to form a second cutting edge 33 which cooperates with the first cutting edges 20 during rotation of the inner cutting member 6. As described above, the second cutting edge 33 cooperates with the first cutting edges 20 to perform hair-cutting operations in use (i.e. hair is cut between the first and second cutting edges 20, 33). The second side wall 26 and the inner wall 30 also meet at an edge 35. The first and second side walls 24, 26 are connected to the outer wall 28 by curved edge portions 36, 38, which in this embodiment have a substantially constant and relatively large radius. The curved edge portions 36, 38 limit irritation of the skin caused by moving the shaving apparatus 1 across a user's skin.

Figure 5:
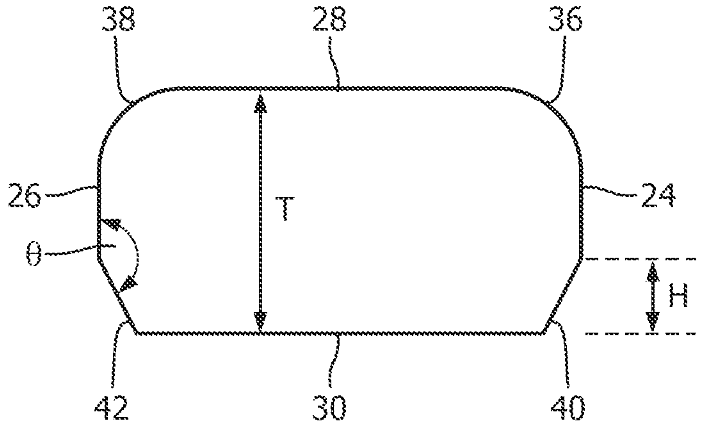
FIG. 5 schematically shows an enlarged view of the cross-section of a non-cutting section of the outer cutting member of FIGS. 2 and 3.

Referring now also to FIG. 5, the non-cutting section 34 of the dividing element 16 similarly comprises a first side wall 24 which bounds an adjacent hair-entry opening, a second opposed side wall 26 which bounds an adjacent opposite hair-entry opening, an outer wall 28 which faces outwards, and an inner wall 30 which faces the inner cutting member 6. The inner and outer walls 28, 30 are spaced apart and parallel and are generally parallel to the cutting plane and perpendicular to the rotational axis 10. The first and second side walls 24, 26 are generally parallel to one another and are substantially perpendicular to the inner and outer walls 28, 30. The first and second side walls 24, 26 are connected to the outer wall 28 by curved portions 36, 38, respectively, which in this embodiment have a substantially constant and relatively large radius. As for the cutting section 32, the curved edge portions 36, 38 limit irritation of the skin caused by moving the shaving apparatus 1 across a user's skin.

Different from the cutting section 32, a first single chamfer 40 is provided between the first side wall 24 and the inner wall 30 of the non-cutting section 34 of the dividing element 16, and a second single chamfer 42 is provided between the second side wall 26 and the inner wall 30 of the non-cutting section 34 of the dividing element 16. Thereby, only a single chamfer 40, 42 is connecting the respective side wall 24, 26 to the inner wall 30 of the non-cutting section 34. The term "chamfer" should be understood to mean a straight section (i.e. the chamfer lies on a single straight line and has no curvature) in the cross-section of the non-cutting section 34 taken perpendicularly to the radial direction relative to the rotational axis 10, as shown in FIGS. 4 and 5. The chamfer is therefore a non-curved straight section (seen in said cross-section) which directly connects the inner wall 30 and the respective side wall 24, 26 of the non-cutting section 34. It will be appreciated that the manufacturing process may not exactly produce defined straight-line edges between the chamfer 40, 42 and the inner wall 30 and the respective side walls 24, 26. In some examples, as an effect of the manufacturing process, there may be small curved sections having a very small radius joining the chamfer 40, 42 to the respective walls. However, it should be understood that such curved sections can be considered negligible and, to all intents and purposes, the chamfer directly connects the respective inner wall to the respective side wall. It will be further appreciated that, in embodiments wherein the hair-entry openings are not straight but have a curved shape in their main extension direction, the chamfers will have a corresponding curved shape in their extension direction along the hair-entry openings, i.e. in a direction perpendicular or transverse to said cross-section.

In the present embodiment an internal angle θ (indicated in FIG. 5) of between 120° and 160° is formed between the side wall 24, 26 and the single chamfer 40, 42. Further, the single chamfer 40, 42 is formed over a height H (indicated in FIG. 5) of between 0.02 mm and 0.10 mm, or more preferably between 0.025 mm and 0.08 mm. The height H of the single chamfer 40, 42 is measured in a direction perpendicular to the cutting plane, i.e. perpendicular to the inner surface 30 and outer surface 28. The thickness T of the dividing element 16 (indicated in FIG. 5) measured in a direction perpendicular to the cutting plane, i.e. a distance between the inner surface 30 and the outer surface 28, may be between 0.05 mm and 0.3 mm, and in a preferred embodiment is approximately 0.2 mm. The single chamfer 40, 42 may be formed over a height H of between 10 and 40% of the thickness T of the dividing element 16.

Although not shown, a gradual transition between the geometry of the cutting section 32 and the non-cutting section 34 may be provided.

Figure 6:
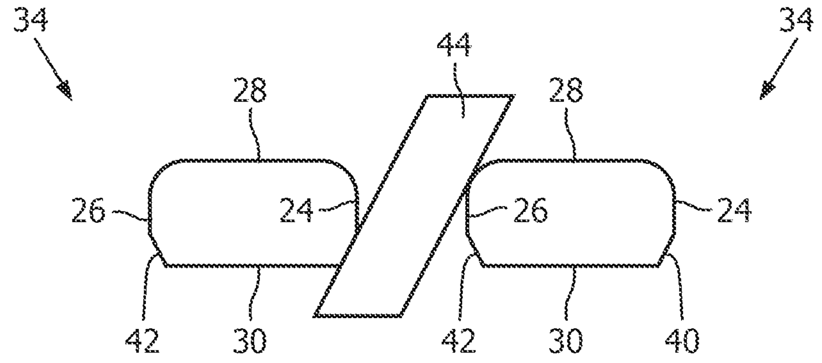
FIG. 6 schematically shows a hair within a hair-entry opening between non-cutting sections of the outer cutting member of FIGS. 2 and 3.

Referring now to FIG. 6, in use, hair 44 enters the hair-entry opening 14 and, if it crosses the planar cutting area 22, then it is cut. It will be appreciated that hair 44 within the hair-entry opening 14 but outside of the cutting area 22 will not be cut. However, the single chamfers 40, 42 provided on the non-cutting sections 34 of the dividing elements 16 easily guide the hair through the hair-entry opening 14 and the hair easily glides over the single chamfers 40, 42. Since the hair 44 is easily guided over the single chamfers 40, 42 it does not catch on any edges and therefore improves the comfort and the user's experience. The single chamfers 40, 42 therefore prevent the hairs from snagging and being pulled on.

Figure 7:
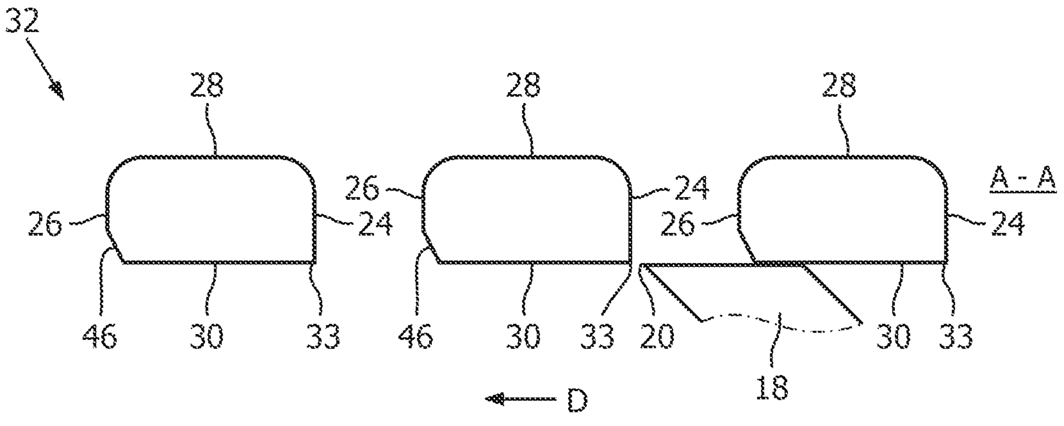
FIG. 7 shows a cross-sectional view of an alternative embodiment of a cutting mechanism according to the invention.

FIG. 7 shows an alternative embodiment in which a single chamfer 46 is also formed between the second side wall 26 and the inner wall 30 of the cutting section 32 of the dividing elements 16. Of course, a substantially sharp cutting edge 33 is still provided between the first side wall 24 and the inner wall 30 of the cutting section 32. As a result of the single movement direction D of the first cutting edges 20 of the inner cutting member 8, the edge portions connecting the second side walls 26 and the inner wall 30 of the cutting sections 32 of the dividing elements 16 do not have a cutting function. Therefore, the provision of the single chamfers 46 on said edge portions does not reduce the hair-cutting performance of the cutting mechanism, but further improves the level of user comfort during use, in addition to the single chamfers 40, 42 provided on the non-cutting sections 34, as the single chamfers 46 likewise prevent hairs from snagging and being pulled on in said edge portions of the cutting sections 32.

A method of manufacturing the outer cutting member 6 according to the invention will now be described with reference to FIGS. 8(A)-8(E).

Initially a blank 100 having the required hair-entry openings 14 and non-profiled dividing elements 16 is manufactured. The blank 100 having the hair-entry openings 14 may be manufactured using any suitable process such as by stamping, electrical discharge machining (EDM), electro-chemical machining (ECM), milling, sawing or by any other suitable technique well known to those skilled in the art. The blank 100 is a substantially planar element. The dividing elements 16 are non-profiled in as much as they simply comprise first and second side walls 24, 26 and inner and outer walls 28, 30 that all meet at a right angled edge.

The edges of the dividing element 16 are profiled using a pressing (otherwise referred to as a coining) operation. In particular, the blank 100 is pressed between a first die 102, which faces the inner wall 30 of the dividing element 16, and a second die 104 which faces the outer wall 28 of the dividing element. It is noted that FIGS. 8(A)-8(E) only schematically shows show a single dividing element 16 of the blank 100, a section of the first die 102 positioned to shape the edges of the inner wall 30 of the single dividing element 16, and a section of the second die 104 positioned to shape the edges of the outer wall 28 of the single dividing element 16. It will be evident for the skilled person that, in reality, the first die 102 may have a plurality of such sections as shown in FIGS. 8(A)-8(E) mutually connected into a single tool, and the second die 104 may have a plurality of such sections as shown in FIGS. 8(A)-8(E) mutually connected into a single tool, and it will be evident for the skilled person how to construct such single tools in order to be able to perform the required pressing operation onto the blank 100 comprising the plurality of hair-entry openings 14 and dividing elements 16.

Figures 8A, 8B, 8C, 8D, 8E:
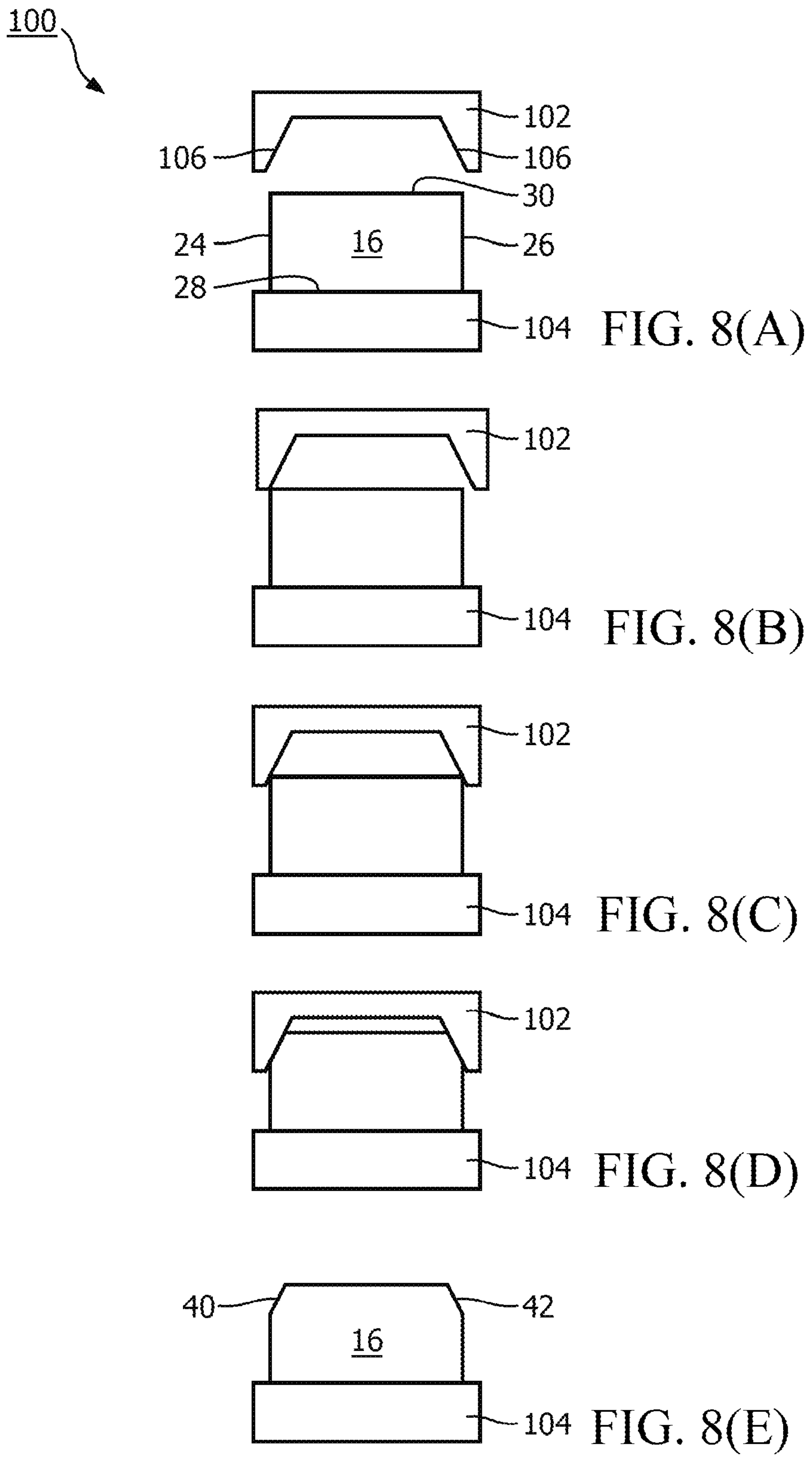
FIG. 8(A) schematically shows a first step of a first embodiment of a method of manufacturing an outer cutting member of a cutting mechanism according to the invention.
FIG. 8(B) schematically shows a second step of the first embodiment of a method of manufacturing an outer cutting member of a cutting mechanism according to the invention.
FIG. 8(C) schematically shows a third step of the first embodiment of a method of manufacturing an outer cutting member of a cutting mechanism according to the invention.
FIG. 8(D) schematically shows a fourth step of the first embodiment of a method of manufacturing an outer cutting member of a cutting mechanism according to the invention.
FIG. 8(E) schematically shows a fifth step of the first embodiment of a method of manufacturing an outer cutting member of a cutting mechanism according to the invention.

The blank 100 is placed onto the second die 104 with the inner wall 30 facing the first die 102 (FIG. 8A) and then the first die 102 is moved towards the blank 100. The first die 102 comprises chamfer-forming angled surfaces 106 which are configured to form the single chamfers 40, 42 on the non-cutting sections 34 of the dividing elements 16. As first die 102 is further moved towards the blank 100, the angled surfaces 106 of the first die 102 come into contact with the edges between the inner wall 30 and the first and second side walls 24, 26 of the dividing element 16 (FIG. 8B). If the blank 100 is not perfectly aligned with the first and second dies 102, 104, then the angled surfaces 106 coming into contact with the edges cause the blank 100 to move with respect to the first and second dies 102, 104 so as to correctly align the blank 100 with the first and second dies 102, 104 (FIG. 8-8C). In particular, the chamfer-forming angled surfaces 106 cause the blank 100 to move in a direction perpendicular to the pressing direction so as to correctly align it with respect to the first and second dies 102. 104. Further movement of the first die 102 causes the singles chamfers 40, 42 to be formed in the dividing element 16 (FIG. 8D). After the single chamfers 40, 42 have been formed, the first die 102 is removed (FIG. 8E). The use of the angled surfaces 106 to form the single chamfers 40, 42 and to simultaneously and automatically align the blank 100 is particularly beneficial.

Figure 9A:
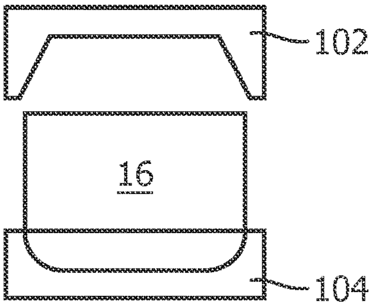
FIG. 9(A) schematically shows second embodiment of a method of manufacturing an outer cutting member of a cutting mechanism according to the invention.
Figure 9B:
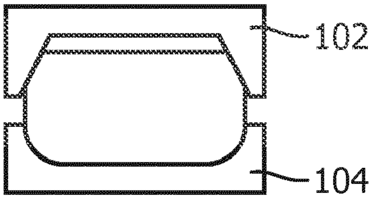
FIG. 9(B) schematically shows a third embodiment of a method of manufacturing an outer cutting member of a cutting mechanism according to the invention.
Figure 9C:
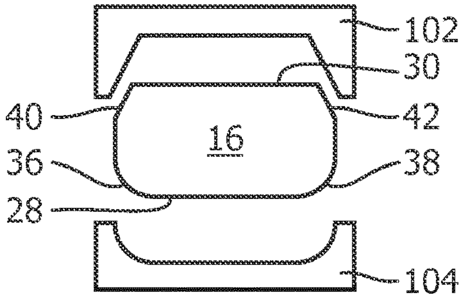
FIG. 9(C) schematically shows a fourth embodiment of a method of manufacturing an outer cutting member of a cutting mechanism according to the invention.

The rounded edges 36, 38 on the outer walls 28 of the dividing elements 16 may be formed separately by another process or, as shown in FIGS. 9(A), 9(B) and 9(C), the second die 104 may be shaped so as to simultaneously form the rounded edges 36, 38 during the pressing operation forming the single chamfers 40, 42. In another embodiment, the rounded edges 36, 38 may be formed by pressing/coining using a separate die. Once the blank 100 has been pressed/coined to profile the edges 36, 38, the blank 100 may be formed into a cup-shaped (i.e. a convex outer surface may be formed) outer cutting member 6 such that it can be fitted over the inner cutting member 8.

It will be evident for the skilled person that, although not shown in the figures, the single chamfers 46 between the inner walls 30 and the second side walls 26 of the cutting sections 32 of the dividing elements 16 in the embodiment of FIG. 7 can be provided in a similar way by means of a pressing operation. It will be evident that, in order to provide a single chamfer 46 only on the second side walls 26 of the cutting sections 32 and not on the first side walls 24 of the cutting sections 32, the first die 102 as shown in FIGS. 8(A)-8(E) and 9(A)-9(C) will have only a single chamfer-forming angled surface 106. Instead of the second chamfer-forming angled surface 106 of the first die 102 as shown in FIGS. 8(A)-8(E) and 9(A)-9(C), a suitable sharp straight-angled section may be provided to form the second cutting edge 33. It will be further evident that the first die 102 may comprise first sections to form the single chamfers 40, 42 on the non-cutting sections 34 of the dividing elements 16 and second sections to form the single chamfer 46 on the cutting sections 32 of the dividing elements 16, and that such first and second sections may be part of one single tool as already described here before. It will be evident for the skilled person how to construct such a single tool in order to be able to perform the required pressing operation simultaneously onto the cutting sections 32 and the non-cutting sections 34 of the dividing elements 16 provided in the blank 100.

The hair-cutting apparatus according to the embodiments described here before is a shaving apparatus comprising rotary cutting mechanisms according to the invention, in which the inner cutting member 8 is rotated with respect to the outer cutting member 6 about the rotational axis 10 in a single direction. However, in other embodiments the inner cutting member may be rotated with respect to the outer cutting member in a reciprocating manner in two opposite rotational directions about the rotational axis. The invention also relates to cutting mechanisms in which the inner cutting member performs a linear motion with respect to the outer cutting member, in particular a reciprocating motion in two opposite linear directions. In embodiments with a reciprocating rotational or linear motion of the inner cutting member, the cutting sections of the dividing elements may have a second cutting edge both between their inner wall and their first side wall and between their inner wall and their second side wall to provide a cutting function in both movement directions of the inner cutting member. In such embodiments, single chamfers may only be provided on the non-cutting sections of the dividing elements.

The invention claimed is:

1. A cutting mechanism for a hair cutting apparatus, comprising:

an outer cutting member comprising hair-entry openings;

an inner cutting member comprising a plurality of cutting elements each having a first cutting edge, wherein the inner cutting member is moveable with respect to the outer cutting member so as to perform a cutting operation within a cutting region of the cutting mechanism;

wherein adjacent openings of the hair-entry openings are separated by a dividing element having a cutting section and a non-cutting section, wherein the non-cutting section is outside the cutting region to not contact the plurality of cutting elements, the non-cutting section having an inner wall facing the inner cutting member, an outer wall opposite the inner wall of the non-cutting section, and a side wall perpendicular to the inner wall of the non-cutting section, and wherein, seen in a cross-section of the dividing element taken perpendicularly to the inner wall of the non-cutting section and extending parallel to a local movement direction of the first cutting edges relative to the dividing element, a single planar chamfer is provided between the inner wall of the non-cutting section and the side wall of the non-cutting section.

2. The cutting mechanism according to claim 1, wherein the non-cutting section further comprises a further side wall, the side wall of the non-cutting section and the further side wall of the non-cutting section being perpendicular to the inner wall of the non-cutting section, and wherein, seen in the cross-section of the dividing element, a further single planar chamfer is provided between the inner wall of the non-cutting section and the further side wall of the non-cutting section.

3. The cutting mechanism according to claim 1, wherein the non-cutting section comprises a first portion positioned on a first side of the cutting region and a second portion positioned on a second side of the cutting region opposite to the first side.

4. The cutting mechanism according to claim 1, wherein a height of the single planar chamfer is between 10% and 40% of a distance between an inner surface and an outer surface of the dividing element.

5. The cutting mechanism according to claim 1, wherein a height of the single planar chamfer is between 0.02 mm and 0.10 mm.

6. The cutting mechanism according to claim 1, wherein a width of at least one of the hair-entry openings is between 0.15 mm and 0.45 mm.

7. The cutting mechanism according to claim 1, wherein a distance between an inner surface and an outer surface of the dividing element is between 0.05 mm and 0.3 mm.

8. The cutting mechanism according to claim 1, wherein the inner cutting member is rotatable about a rotational axis with respect to the outer cutting member so as to perform the cutting operation within the cutting region of the cutting mechanism, and wherein at least a portion of the non-cutting section is positioned radially outwards or radially inwards of the cutting region of the cutting mechanism with respect to the rotational axis.

9. The cutting mechanism according to claim 1, wherein the cutting section lies within the cutting region for cutting hair in cooperation with the plurality of cutting elements, the cutting section having an inner wall and a side wall, the inner wall of the cutting section facing the inner cutting member, the side wall of the cutting section meeting the inner wall of the cutting section to form a second cutting edge, the second cutting edge arranged to cooperate with the first cutting edge of a cutting element of the plurality of cutting elements, wherein a further side wall of the cutting section is perpendicular to the inner wall of the cutting section, and wherein, seen in a further cross-section of the dividing element taken perpendicularly to the inner wall of the cutting section and extending parallel to the local movement direction of the first cutting edges relative to the dividing element, a further single planar chamfer is provided between the inner wall of the cutting section and the further side wall of the cutting section opposite to the side wall of the cutting section.

10. The cutting mechanism according to claim 1, wherein an internal angle between the single planar chamfer and the side wall of the non-cutting section is between 120° and 160°.

11. The cutting mechanism according to claim 1, wherein a distance between the inner wall of the non-cutting section and the outer wall of the non-cutting section of the dividing element is between 0.21 mm and 0.3 mm, and wherein the single planar chamfer forms an internal angle with the side wall of the non-cutting section of between 120° and 149°.

12. A hair cutting apparatus having at least one cutting mechanism and a housing supporting the at least one cutting mechanism, the at least one cutting mechanism comprising:

an outer cutting member comprising hair-entry openings;

an inner cutting member comprising a plurality of cutting elements each having a first cutting edge, wherein the inner cutting member is moveable with respect to the outer cutting member so as to perform a cutting operation within a cutting region of the cutting mechanism;

wherein adjacent openings of the hair-entry openings are separated by a dividing element having a cutting section and a non-cutting section, wherein the non-cutting section is outside the cutting region to not contact the plurality of cutting elements, the non-cutting section having an inner wall facing the inner cutting member, an outer wall opposite the inner wall of the non-cutting section, and a side wall perpendicular to the inner wall of the non-cutting section, and wherein, seen in a cross-section of the dividing element taken perpendicularly to the inner wall of the non-cutting section and extending parallel to a local movement direction of the first cutting edges relative to the dividing element, a single planar chamfer is provided between the inner wall of the non-cutting section and the side wall of the non-cutting section.

* * * * *